United States Patent [19]

Borowitz et al.

[11] Patent Number: 4,777,982

[45] Date of Patent: Oct. 18, 1988

[54] ELASTIC SEPARATING WALL

[75] Inventors: Jürgen Borowitz, Berglen; Walter Holl, Stuttgart; Volkmar Leutner, Friolzheim, all of Fed. Rep. of Germany

[73] Assignee: Robert Bosch GmbH, Stuttgart, Fed. Rep. of Germany

[21] Appl. No.: 73,960

[22] Filed: Jul. 15, 1987

[30] Foreign Application Priority Data

Aug. 22, 1986 [DE] Fed. Rep. of Germany ....... 3628608

[51] Int. Cl.[4] ................................................ F16L 55/04

[52] U.S. Cl. ....................................... 138/30; 220/85 B

[58] Field of Search .......................... 138/30; 220/85 B

[56] References Cited

U.S. PATENT DOCUMENTS 3,063,470 11/1962 Forster .................................. 138/30

3,368,586 2/1968 French et al. ......................... 138/30

3,397,719 8/1968 Ortheil .................................. 138/30

3,425,593 2/1969 Krämer et al. .................. 138/30 X 3,442,293 5/1969 Erdmann ............................... 138/30

4,402,346 9/1983 Cheetham et al. ............. 138/133 X

*Primary Examiner*—Mark J. Thronson

*Attorney, Agent, or Firm*—Michael J. Striker

[57] ABSTRACT

An elastic separating wall to be arranged between a gas chamber with a high pressure and a liquid chamber, particularly for a pressure accumulator, comprises an elastic separating wall member composed of a plurality of layers, the layers including at least two outer layers, and at least one inner layer composed of a material having a high gas permeability, means for connecting the elastic separating wall member to a wall of a container in a connecting region, and a passage arranged in the region and communicating with the inner layer with an atmosphere.

15 Claims, 2 Drawing Sheets

ELASTIC SEPARATING WALL

BACKGROUND OF THE INVENTION

The present invention relates to an elastic separating wall which separates a gas chamber with a high pressure from a liquid chamber, particularly in a pressure accumulator.

Such elastic separating walls are known in the art. A known separating wall is composed conventionally of two outer rubber-elastic layers and an inner layer located between the outer layers and composed of a material with lower gas permeability. This prevents penetration of gas from the gas chamber in a great quantity into the liquid chamber, which can lead to disturbances in the hydraulic installations. The known separating walls have, however, the disadvantage that after a long service time a certain quantity of gas still can pass into the liquid.

SUMMARY OF THE INVENTION

Accordingly, it is an object of the present invention to provide a separator wall which avoids the disadvantages of the prior art.

More particularly, it is an object of the present invention to provide a separating wall which reliably prevents penetration of gas from a gas chamber into a liquid chamber during a long operational time.

It is also an object of the present invention to provide the above prevention of penetration of gas with the use of inexpensive means so that the separating wall is not more expensive than the existing separating walls.

In keeping with these objects and with other which will become apparent hereinafter, one feature of the present invention resides, briefly stated, in an elastic separating wall to be arranged between a gas chamber with a high pressure and a liquid chamber, particularly for a pressure accumulator, which comprises an elastic separating wall member composed of a plurality of layers, the layers including at least two outer layers, and at least one inner layer composed of a material having a high gas permeability, means for connecting the elastic separating wall member to a wall of a container in a connecting region, and passage means arranged in the region and communicating with the inner layer with an atmosphere wherein the passage means includes a porous element and an opening extending therefrom.

In the separating wall of the invention the porous element is formed a ring composed of a porous material and arranged to abut against the wall of the container and against the inner layer, and the opening extends through the wall of the container from the ring to the atmosphere.

The outer layers can be composed of a rubber elastic material and have inner sides, and the separating wall member can further include two additional layers which are each arranged between the inner layer and a respective one of the outer layers and composed of a material with a lower gas permeability.

Also the outer layers can be composed of a material with a lower gas permeability and arranged so that the inner layer is located immediately between and in contact with the two outer layers.

The passage means can also include an annular groove which is provided in said region and opens into said opening, and accommodates an annular spring.

The inner layer can be provided with a plurality of passages for increasing its gas permeability, extending directly to the ring of a porous material, and formed so that they extend in the interior of the inner layer or on a surface of said inner layer.

The inner layer can be composed of a fabric which has the passages, and selected from the group consisting of a coated fabric and uncoated fabric.

The inner layer can include a supporting layer and at least one further layer in which the passages are formed, and which is formed as a flaked layer on the supporting layer, or a deposited layer on the supporting layer.

The inner layer can be composed of a porous material which forms the passage, and selected from the group consisting of multi-file yarn, fabric produced from multi-file yarn, fleece, felt, paper and leather.

The porous material of the inner layer can be coated with a coating connecting the inner layer with a respective one of said outer layers and composed of a polymer material, preferably of a polymer with a high gas permeability.

The novel features which are considered as characteristic for the invention are set forth in particular in the appended claims. The invention itself, however, both as to its constuction and its method of operation, together with additional objects and advantages thereof, will be best understood from the following description of specific embodiments when read in connection with the accompanying drawings.

DESCRIPTION OF THE PREFERRED EMBODIMENTS

Figure 1:
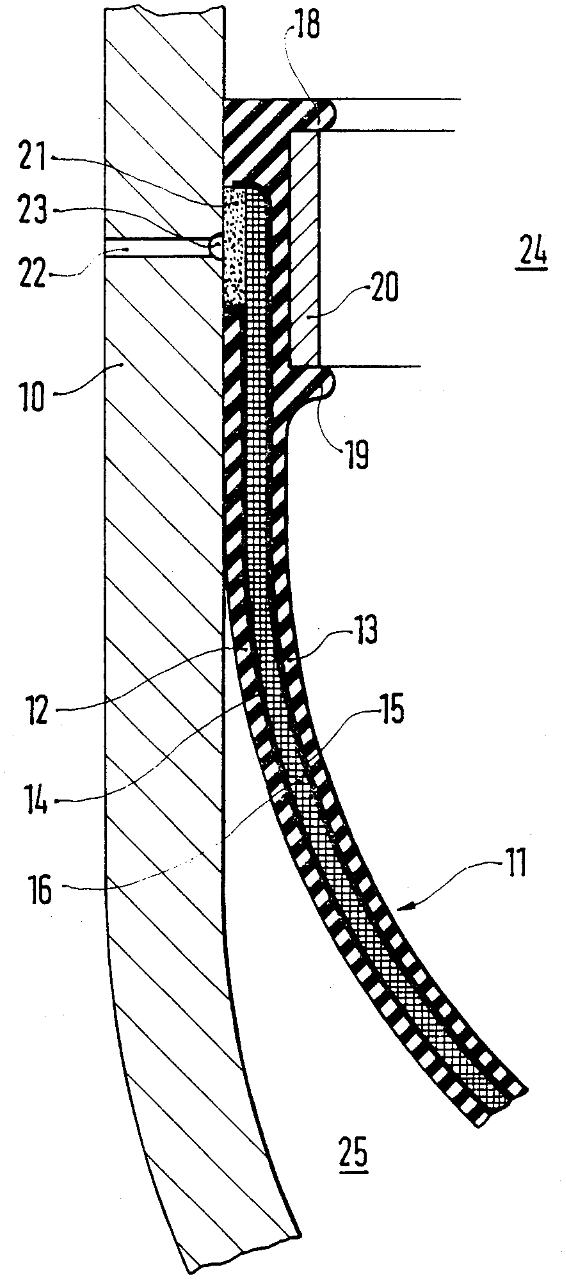
FIG. 1 is a view showing a longitudinal section of a separating wall in accordance with the present invention arranged in a partially shown housing of a pressure accumulator.

A separating wall in accordance with the present invention is used in a conventional pressure accumulator which has a container wall identified with reference numeral 10. The elastic separating wall of the invention is formed as a diaphragm and identified with the reference numeral 11.

The separating wall includes several layers, namely two outer layers 12 and 13 which are composed of a rubber-elastic material, two inner layers 14 and 15 arranged at the inner side of the outer layer and having a material with a lower gas permeability, and a central relatively thick layer 16 which is composed of a material with a higher gas permeability. The layers 14 and 15 are advantageously formed as thin foils. All layers are connected with one another by means of an adhesive.

Two annular beads 18 and 19 are formed on an open edge of the layer 13 and face toward the interior of the container. In this area the separating wall is pressed against the inner wall of the container by means of a clamping ring 20 which is located between the annular beads 18 and 19. Such clamping arrangement is known in pressure accumulators and therefore not described here in detail. The central layer 16 extends to a region which is located substantially between the annular beads 18 and 19. The layer 16 at its upper edge is in contact with the ring 21 which contacts the container wall 10 and is composed of a porous and at the same time mechanically stable material, for example sintered material. An annular groove 23 is formed in the inner wall of the container in this region. The annular groove 23 communicates with an atmosphere via an opening 23 which extends through the container wall.

For the operation of the elastic separating wall of the invention it is very important to have a maximum possible ratio of the gas permeability of the central layer 16 relative to the outer layers 12–15, since thereby at the inner side of layers 14 and 15, the partial pressure of the gas is reduced, which gas in a gas chamber 25 is under high pressure. Gas which penetrates from the gas chamber 24 through the layers 13 and 15 reaches the central layer 16, which is advantageously composed of a polymer with high gas permeability. Gas which reaches this layer, flows to the porous ring 21 and then escapes through the opening 22 to the atmosphere. The smaller is the diffusion resistance of the material of the layer 16, the smaller is the partial pressure of the gas in this layer. Thereby, only very small partial pressure drop with respect to the liquid side takes place at the layers 14 and 12. This leads in connection with the high diffusion resistance of the layer 14, to a neglectibly small gas diffusion into the liquid chamber.

The materials for the elastic separating wall of the invention are known from respective publications, for example, from the German Patent Document DE-GM No. 8,226,197 or also from respective textbooks. This is true also for the next embodiment illustrated in FIG. 2.

Instead of the porous ring 21, it is possible to arrange in the groove 23 a worm spring or another structure which has a lower diffusion resistance and sufficient supporting action for the separating wall.

Figure 2:
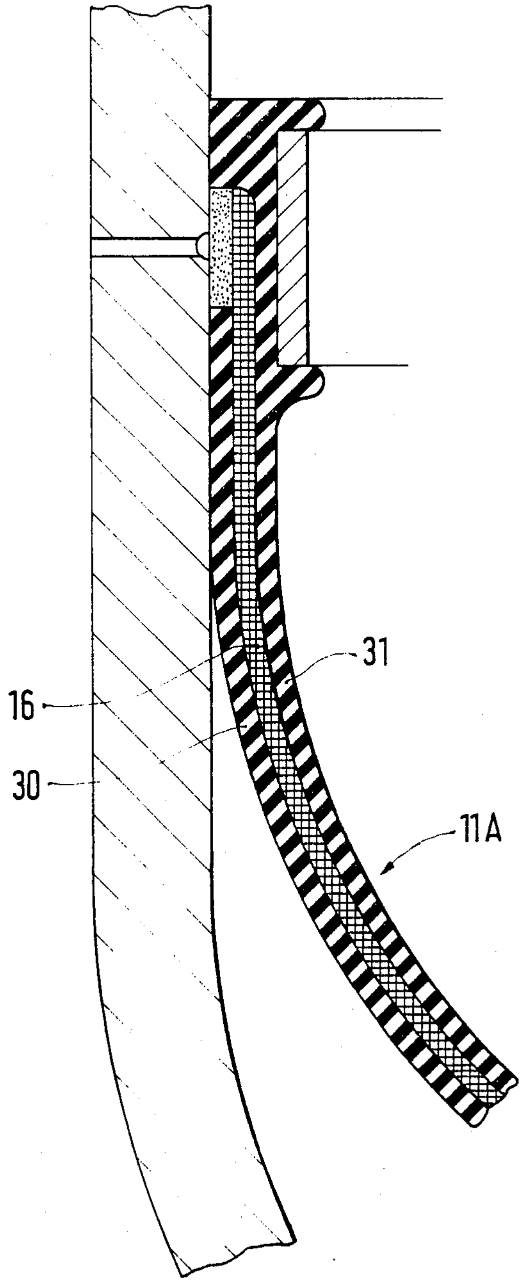
FIG. 2 is a view substantially corresponding to the view of FIG. 1 but showing another embodiment of the separating wall of the present invention.

The separating wall in accordance with the embodiment of FIG. 2 differs from the embodiment of FIG. 1 in that the elastic separating wall which is identified here with reference 11*a* is composed only of three layers. These layers include two outer layers 30 and 31 which are composed of a material with lower gas permeability, and a central layer 16 which is formed similarly to the central layer of the first embodiment. When the elastic separating wall is designed in accordance with the invention, a passage of gas from the gas chamber 24 into the liquid chamber 25 is reliably prevented. The important contribution to this is achieved by the central layer 16 together with the porous ring 21, and the gas outlet opening 22, 23 to atmosphere.

The gas permeability of the central or innermost layer 16 can be improved by providing in it a plurality of passages which are formed in this layer or outside on it. For this purpose suitable materials are: fabric [coated, or uncoated], paper, fleece or felt, flaked layers of fiber, leather, material like multi-file yarns, filter of porous hollow fiber membranes, etc.

It will be understood that each of the elements described above, or two or more together, may also find a useful application in other types of constructions differing from the types described above.

While the invention has been illustrated and described as embodied in an elastic separating wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An elastic separating wall to be arranged between a gas chamber with a high pressure and a liquid chamber, comprising an elastic separating wall member composed of a plurality of layers, said layers including at least two outer layers, and at least one inner layer composed of a material having a high gas permeability; a connecting region; means for connecting said elastic separating wall member to a wall of a container at said connecting region; and passage means arranged in said region and communicating said inner layer with an atmosphere, said passage means including a porous element and an opening extending therefrom.

2. The invention as defined in claim 1, wherein said connecting means includes a clamping member which is arranged to clamp said separating wall member to the wall of the container.

3. The invention as defined in claim 1, wherein said porous element is a ring composed of a porous material and arranged to abut against the wall of the container and against said inner layer, and said opening extending through the wall of the container from said ring to the atmosphere.

4. The invention as defined in claim 1, wherein said outer layers are composed of a rubber elastic material and have inner sides, said separating wall member further including two additional layers which are each arranged between said inner layer and a respective one of said outer layers and composed of a material with a lower gas permeability.

5. The invention as defined in claim 1, wherein said outer layers are composed of a material with a lower gas permeability and arranged so that said inner layer is located immediately between and in contact with said two outer layers.

6. The invention as defined in claim 3, wherein said passage means also include an annular groove which is provided in said region and opens into said opening.

7. The invention as defined in claim 1, wherein said inner layer is provided with a plurality of passages for increasing its gas permeability.

8. The invention as defined in claim 3, wherein said inner layer is provided with a plurality of passages for increasing its gas permeability and extending directly to said ring of a porous material.

9. The invention as defined in claim 7, wherein said passages in said layer are formed so that they extend in the interior of said inner layer.

10. The invention as defined in claim 7, wherein said passages of said inner layer are formed so that they extend on a surface of said inner layer.

11. The invention as defined in claim 7, wherein said inner layer is composed of a fabric which has said passages.

12. The invention as defined in claim 7, wherein said fabric is selected from the group consisting of a coated fabric and uncoated fabric.

13. The invention as defined in claim 7, wherein said inner layer is composed of a porous material which forms said passages.

14. The invention as defined in claim 13, wherein said porous material is selected from the group consisting of multi-file yarn, fabric produced from multi-file yarn, fleece, felt, paper and leather.

15. The invention as defined in claim 1, wherein said inner layer is composed of a polymer with a high gas permeability.

* * * * *